June 26, 1956  C. A. DREISBACH  2,751,989
PARKING DEVICE FOR AUTOMOTIVE VEHICLES
Filed May 14, 1952  3 Sheets-Sheet 1
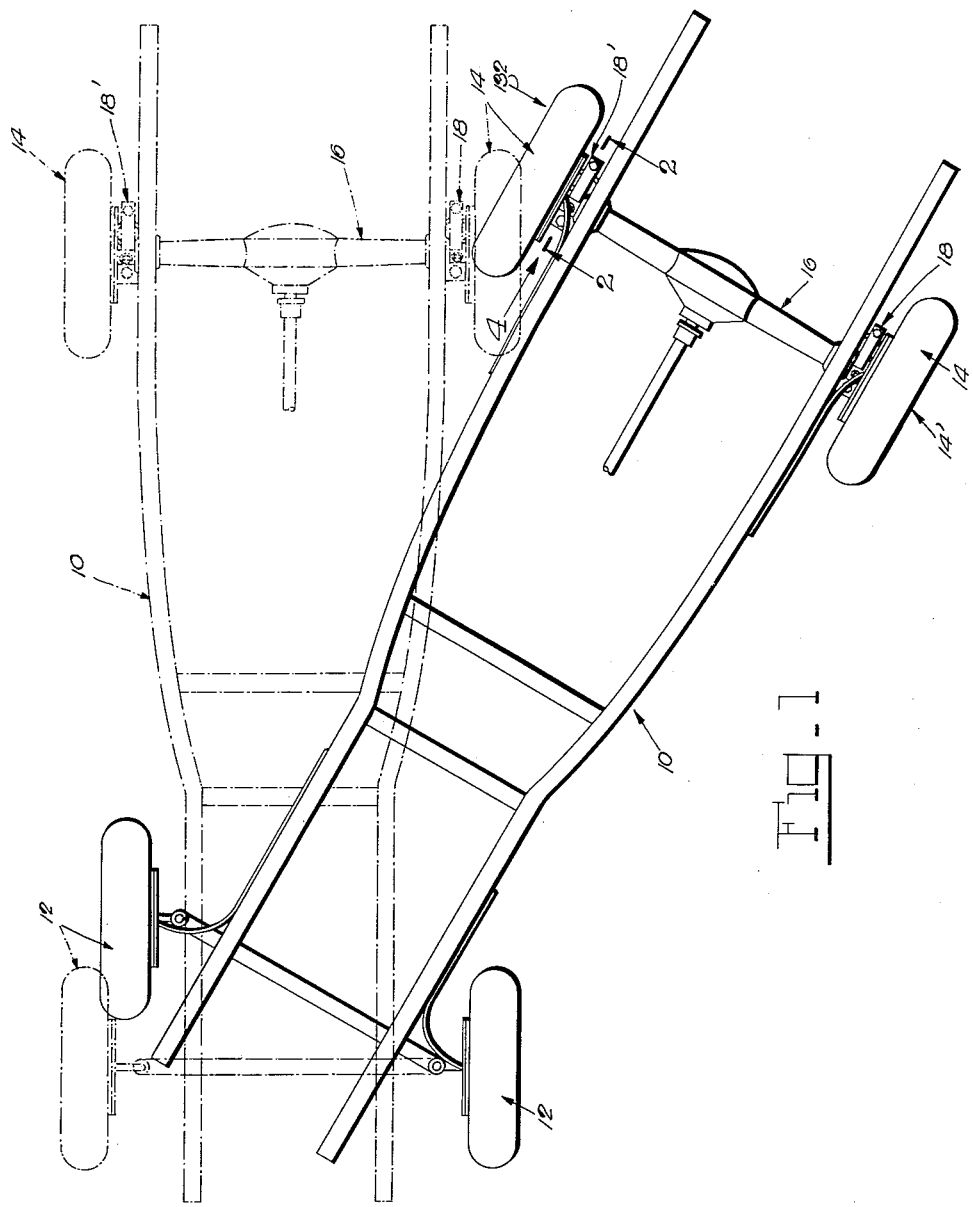
Inventor:
Charles A. Dreisbach
by: Stewart & Sprengel
Attorneys.

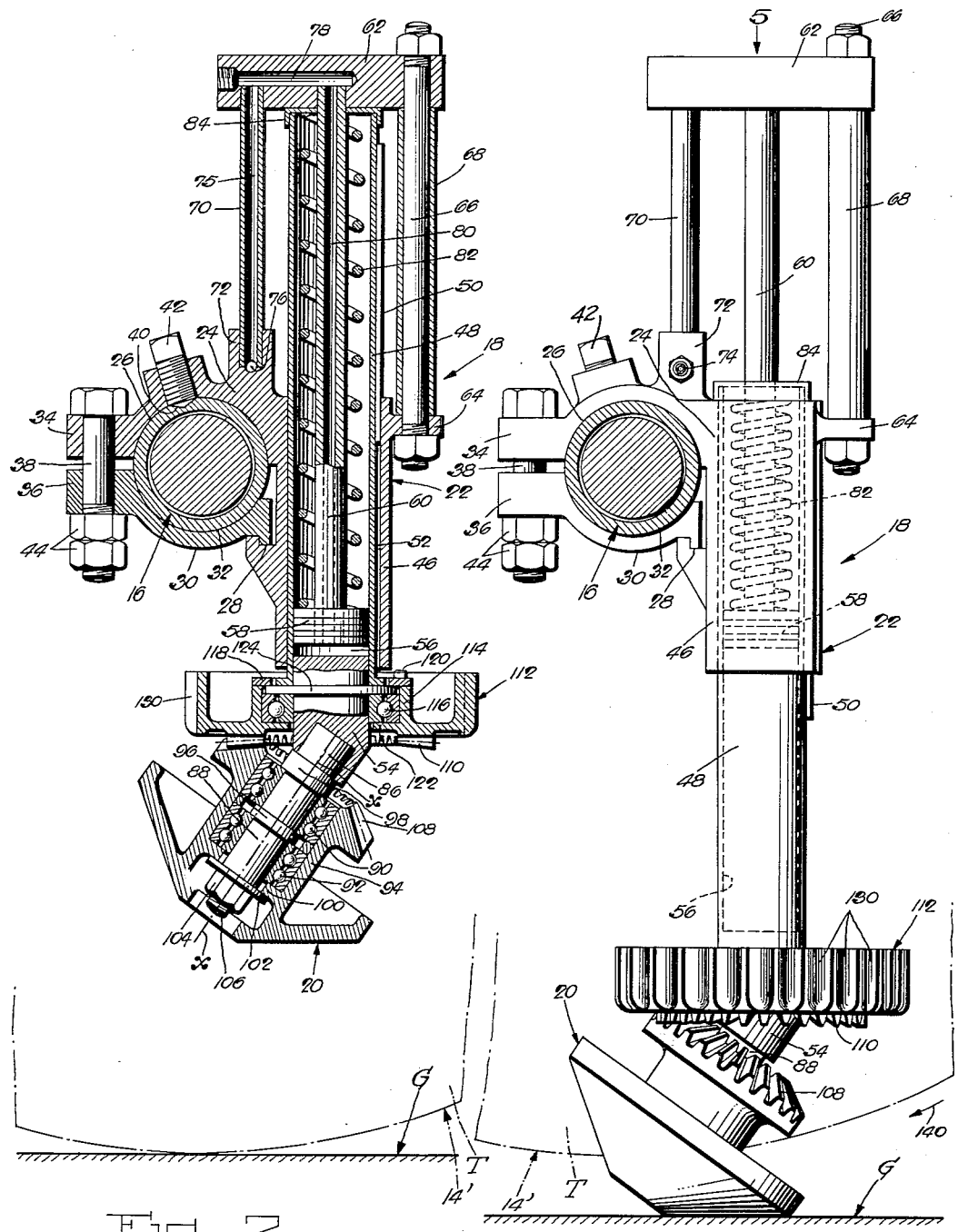

June 26, 1956     C. A. DREISBACH     2,751,989
PARKING DEVICE FOR AUTOMOTIVE VEHICLES
Filed May 14, 1952     3 Sheets-Sheet 3
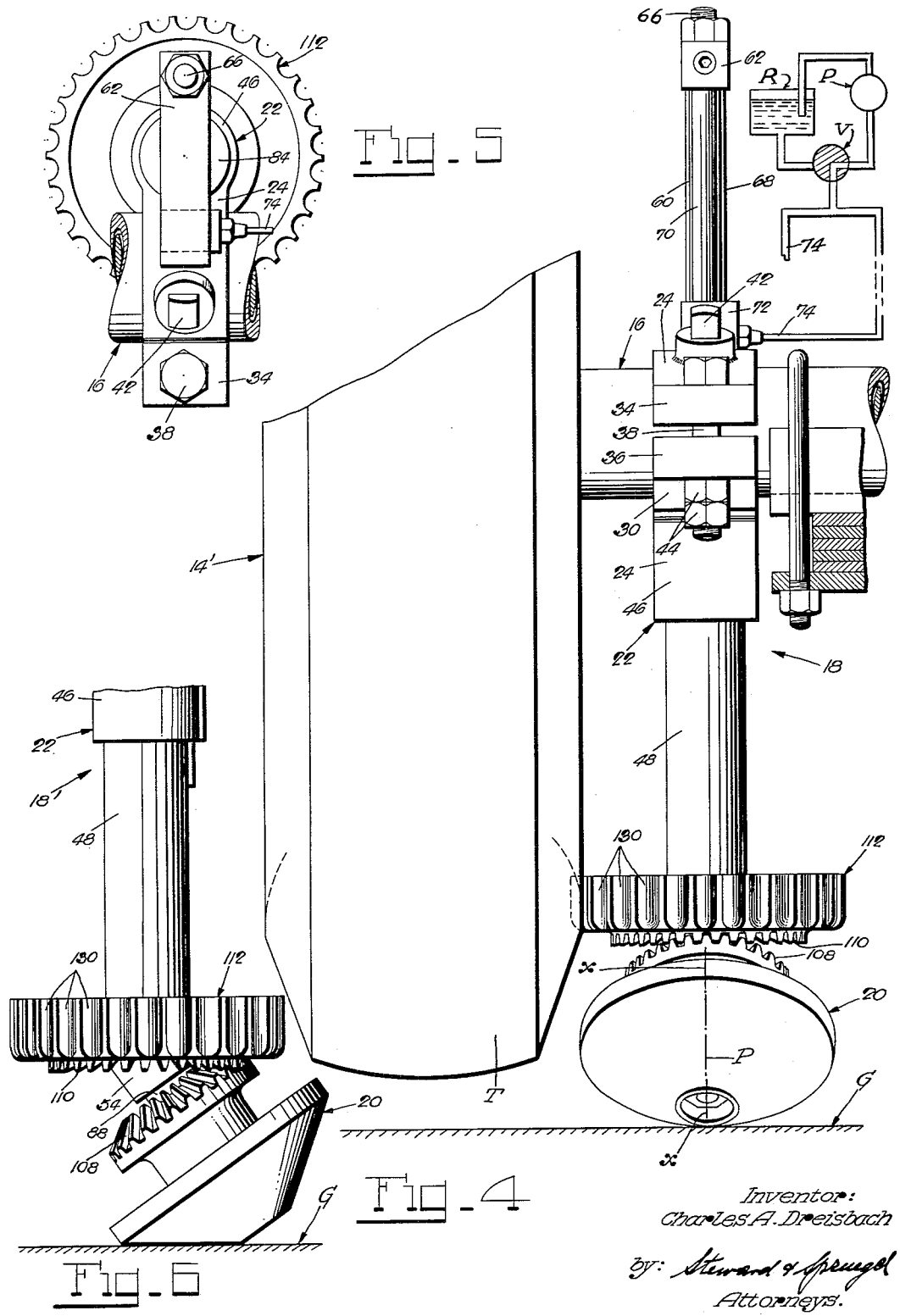
Inventor:
Charles A. Dreisbach
by: Steward & Sprengel
Attorneys.

United States Patent Office 2,751,989
Patented June 26, 1956

2,751,989
PARKING DEVICE FOR AUTOMOTIVE VEHICLES

Charles A. Dreisbach, Yonkers, N. Y.

Application May 14, 1952, Serial No. 287,735

6 Claims. (Cl. 180—1)

This invention relates to parking devices for automotive vehicles, and more particularly to parking devices of the type which are installed in conventional rear-drive automobiles and are used for rolling the same sideways at the rear ends thereof under the control of the operators of the automobiles.

Parking devices of this type are highly useful in that they greatly facilitate numerous car maneuvers, such as parking, for instance, which frequently are difficult to perform even by the most experienced drivers. Devices of this type have been known heretofore, but these are either too complicated and costly for the purpose in mind, or afford inadequate control over their performance on different grades of ground, or both.

It is an object of the present invention to provide a parking device of this type which is structurally exceedingly simple and of very small bulk, yet highly reliable in its performance, and which is at all times under the full and safe control of the driver of the automobile in which the device is installed.

It is another object of the present invention to provide parking devices of this type which may readily be installed in new automobiles in the factory, or as accessories in used automobiles by ordinary mechanics, and which require for their performance no structural changes whatever, or additions to, the conventional power drives of the automobiles in which they are installed.

A further object of the present invention is to provide a parking device of this type having two separate units adjacent the rear wheels, respectively, of an automobile, of which each unit comprises an auxiliary side-motion roller and a jack which is installed on the chassis of the automobile, carries the roller and serves to lower the latter onto the ground sufficiently to raise the adjacent rear wheel off the ground, and the roller of each unit will, on lowering, become drivingly engaged with the adjacent rear wheel of the automobile so that the lowered rollers of both units will be driven from the motor of the automobile and any side motion of the rear end of the latter will be under the control of the driver as fully as during forward or backward driving of the automobile.

Another object of the present invention is to provide each of the aforementioned units of a parking device of this type with a disc or wheel which is in permanent driving relation, and raised and lowered, with the roller thereof and which, on lowering the same, moves into frictional driving engagement with a side wall of the pneumatic tire on the adjacent rear wheel of the automobile, thus using for the power drive of the rollers of both units the driven rear wheels of the automobile without requiring any changes in or modifications of the tires thereon.

It is a further object of the present invention to coordinate the roller and disc of each of the aforementioned units of a parking device of this type so that the disc will, on being lowered, move into frictional driving engagement with the pneumatic tire on the adjacent rear wheel of the automobile and will remain in frictional driving engagement therewith at least while the adjacent rear wheel is being raised to its uppermost position, thus placing the rollers of both units under the control of the conventional rear-wheel brakes of the automobile even while the rear end of the latter is raised preparatory to a side drive thereof in either direction.

It is another object of the present invention to have the aforementioned units of a parking device of this type arranged between the rear wheels of an automobile so that they are inconspicuous, if not well hidden from view, especially when not in use, and nevertheless construct these units either identically for reversible mounting, or with a part simply reversed for identical mounting, so that their rollers will be driven for uni-directional side motion of the rear end of the automobile despite the drive of their respective friction discs from opposite sides by the adjacent rear wheels of the automobile.

A further object of the present invention is to provide a parking device of which the aforementioned units are sturdy in construction, may readily be removably mounted on the chassis of an automobile, and lend themselves to efficient mass production at low cost.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a top view of an automobile chassis having installed thereon a parking device embodying the present invention;

Fig. 2 is an enlarged longitudinal section through one of two separate units of the parking device in retracted or inoperative position, the section being taken on the line 2—2 of Fig. 1;

Fig. 3 is a side view of the same unit of the parking device in extended or operative position;

Fig. 4 is a rear view of the same unit of the parking device in its operative position as viewed in the direction of arrow 4 in Fig. 1;

Fig. 5 is a top plan view of the same unit of the parking device as viewed in the direction of the arrow 5 in Fig. 3; and Fig. 6 is a fragmentary side view of the other unit of the parking device, the view being similar to that of Fig. 3, and Figs. 3 and 6 showing the different disposition of certain parts of the identical units.

Referring to Fig. 1, the reference numeral 10 designates the chassis of an automobile having conventionally supported front wheels 12 and rear wheels 14, and the usual rear-axle housing 16 through which extend the differential-driven axles for the rear wheels. Suitably mounted on the axle housing 16 between and adjacent to the rear wheels 14 are separate units 18 and 18' which together constitute the parking device of the present invention. Since the units 18 and 18' may either be identical in every respect or have simply one part reversed as hereinafter more fully explained, it is deemed sufficient to give a detailed description of only one of these units, namely the unit 18.

Referring now more particularly to Figs. 2 to 5, the unit 18 comprises mainly a roller 20 and a lifting jack 22 which carries the roller 20 and is mounted on the axle housing 16 near the left rear wheel 14' of the automobile. More particularly, the jack 22 comprises a mounting member 24 having a bearing aperture 26 and a grooved ledge 28 with which is releasably interlocked a cap member 30, having a bearing aperture 32 (Figs 2 and 3). The bearing apertures 26 and 32 of the mounting and cap members 24 and 30, respectively, complement each other in embracing the axle housing 16 which is customarily circular in cross-section. The mounting member 24 and cap member 30 are provided with lateral flanges 34 and 36, respectively, through which extends a bolt 38 for drawing these members into firm clamping engagement with the axle housing 16 so as to become to all intents and purposes integral parts of the latter. To facilitate the mounting of the unit 18 in accurate angular position on the axle housing 16, the latter may be indented at 40 with the tip of a drill, for instance, for receiving the conical end of a screw 42 in the mounting member 24. The screw 42 will easily hold the unit 18 in its correct angular disposition on the axle housing 16 until the nuts 44 on the bolt 38 are drawn tight, and the conical end of the mounted screw 42 will further act as a key to positively lock the unit 18 against angular displacement on the axle housing.

The mounting member 24 is further provided with a preferably integral sleeve extension 46 in which is guided for axial movement a tubular member 48, having an outer longitudinal key 50 received in an internal groove 52 in the sleeve extension 46 to prevent rotation of the tubular member 48 in the mounting member 24. Permanently secured in the lower end of the tubular member 48 in sealing fashion, as by brazing, for instance, is a plug 54 which together with the member 48 forms a cylinder 56 in which a piston 58 is slidable. The piston 58 has a rod 60 which is suitably mounted with its upper end in a cross head 62 that is, in turn, mounted on the member 24 in spaced relation therewith. To this end, the cross head 62 and a flange-like projection 64 on the mounting member 24 are at one side of the tubular member 48 connected by a bolt 66, and surrounding the bolt 66 and interposed between the cross head 62 and the projection 64 on the mounting member 24 is a spacer sleeve 68. Further, a tie rod 70 is at the opposite side of the tubular member 48 permanently secured with its opposite ends, as by brazing, welding or threading, for instance, in the cross head 62 and in a boss 72 on the mounting member 24.

The piston 58 is single-acting and the cylinder 56 is in this instance a hydraulic cylinder. Also, the cylinder 56 is, in the present instance, the movable part, and the piston 58 is the stationary part of the hydraulic system. Accordingly, the cylinder 56 serves as the movable ram of the jack 22. In order to admit operating liquid under pressure into the cylinder 56, or to vent the latter, a conduit 74 (Fig. 4) is in permanent communication with a duct 76 in the boss 72 on the mounting member 24 (Fig. 2), and the duct 74 permanently communicates through a longitudinal passage 75 in the tie rod 70 with a passage 78 in the cross head 62, while the passage 78 is in permanent communication with the cylinder 56 through a longitudinal passage 80 in the piston rod 60. Thus, the cylinder 56 and parts carried thereby will, on admission of liquid under pressure in the cylinder, be forced downwardly from the retracted or inoperative position shown in Fig. 2. In order to return the cylinder 56 and parts thereon into the retracted position shown in Fig. 2 when the cylinder is vented, there is provided a compression-type spring 82 which surrounds the piston rod 60 and is interposed between the piston 58 and a cap 84. The cap 84 is suitably secured to the top end of the tubular member 48, as by brazing, welding or threading, for instance. The spring 82 is so pre-compressed that the same will, in the vented condition of the cylinder 56, assuredly force the latter and the parts carried thereby into, and hold them in, the retracted or inoperated position shown in Fig. 2 even when the automobile is subjected to the usual shock or vibration when being driven. On the other hand, the operating liquid for the cylinder 56 must be under such pressure that it will readily move the cylinder from its retracted position against the tendency of the spring 82 to hold it in that position, and additionally hold a substantial portion of the weight of the automobile as will be explained more fully hereinafter.

Firmly secured in any suitable manner at 86 in the plug 54 is a stud 88 which depends from the former in the inclined fashion shown in Fig. 2 and has its axis $x$ lying in a plane P (Fig. 4) which is substantially parallel to the median vertical plane of the automobile. Journalled on antifriction bearings 90 and 92 on the stud 88 is the hub 94 of the roller 20. The bearings 90 and 92 are held against an intermediate snap-on collar 96 on the stud 88, and also against integral collars 98 and 100 on the stud 88 and in the roller hub 94, respectively, by a washer 102 and a nut 104 on the reduced end 106 of the stud 88, thus rotatably supporting the roller 20 on the stud 88 but preventing axial movement thereon.

The outer end of the roller hub 94 is enlarged and formed into a bevel gear 108 which is in permanent mesh with a bevel gear 110 formed integrally with a disc 112. The disc 112 is journalled with its hub 114 on an antifriction bearing 116 on the plug 54 (Fig. 2), and is held against axial movement by a retainer ring 118 which is mounted at 120 on the disc hub 114 and holds on internal shoulder 122 of the disc 112 and the bearing 116 against an integral collar 124 on the plug 54.

The roller 20 is frusto-conical in shape, and is adapted, on being lowered by the jack 22 from the retracted position in Fig. 2 onto the ground G sufficiently to raise the adjacent rear wheel 14' to the same or a similar extent as shown in Fig. 3, to be rolled on the ground for imparting sidewise motion to the rear end of the automobile. The roller 20 is adapted to be driven from the motor of the automobile through intermediation of the disc 112 and the customary pneumatic tire T on the adjacent rear wheel 14' (Fig. 4). To this end, the periphery of the disc 112 will be brought into frictional driving engagement with the adjacent inner sidewall of the tire T when the jack 22 lowers the roller 20 into the operative position shown in Fig. 3. When in driving relation with the tire T, the disc 112 is preferably in such firm engagement with the latter as slightly to indent the adjacent sidewall of the tire (Fig. 4). In order to afford a good grip between tire and disc, the periphery of the latter is preferably fluted as at 130.

The opposite unit 18' (Fig. 1) may in all respects be like the described unit 18, but is for a reason hereinafter described mounted on the axle housing 16 so that the jack thereof is on the side of the axle housing opposite to that on which the jack of the unit 18 is located (Fig. 3). Accordingly, when viewing the unit 18' in the direction of the arrow 132 (Fig. 1), i. e. in the same direction in which the unit 18 in Fig. 3 is viewed, the roller 20 of the unit 18' (Fig. 6) will be oppositely inclined to the roller 20 of the unit 18.

The conduits 74 of both units 18 and 18' may lead to any conventional manually operable valve V (Fig. 4) which is within convenient reach of the driver of the automobile and is also in communication with a supply reservoir R for operating liquid and any suitable liquid pump P which draws liquid from the reservoir and may be operated by any suitable power means. Thus, on manipulating the valve into one of its operating positions, liquid under pressure from the pump will be admitted into the cylinders 56 of both units 18 and 18' and displace them relative to their respective stationary pistons 58, against the compression of the respective springs 82, until the jacks 22 of these units have lowered their respective rollers 20 to the same or a similar extent as indicated in Figs. 3 and 6, raising thereby the rear end of the automobile from the ground. The rollers 20 of both units are now in driving relation with the tires on the adjacent rear wheels 14, and ready to drive the rear end of the automobile sideways in either direction, depending on whether the drive control of the automobile is set for forward or backward driving. The jack 22 of each unit may be prevented from extending beyond the extent shown in Fig. 3 by any suitable stop provision (not shown), or by shifting the mentioned valve into another position in which the liquid in the cylinders 56 of both units 18 and 18' is trapped.

Assuming now that the rear end of the automobile has been jacked up as described when the latter assumes the position shown in full lines in Fig. 1, and the driver of the automobile desires to drive the rear end thereof sideways into the dot-and-dash line position in Fig. 1 against a street curb, for instance, the rollers 20 of the units 18 and 18' in Figs. 3 and 6 will have to roll toward the viewer of these figures. In that case, the driver will in the normal fashion operate the automobile as though driving forward, with the result that the rear wheels 14 will turn in the direction of the arrow 140 in Fig. 3 and drive the rollers 20 of both units in the correct direction, the roller 20 of the unit 18' (Fig. 6) being to this end oppositely inclined to the roller 20 of the unit 18 (Fig. 3) as described, because these rollers are driven from opposite sides by the respective rear wheels 14 as will now be understood. In order to drive the raised rear end of the automobile in the opposite sidewise direction, the driver will operate the automobile as though driving backwards, as is now obvious.

While thus driving the raised rear end of the automobile sideways, the driver has complete clutch and/or brake control over this motion of the automobile because the rollers 20 are driven by the rear wheels 14. Thus, the driver may at any time brake the side motion of the rear end of the automobile by simply applying the conventional foot brake.

After the side drive of the rear end of the automobile is completed, the driver manipulates the beforementioned valve into another position in which to vent the cylinders 56 of both units 18 and 18', by permitting the liquid therein to be returned to the liquid reservoir under the force of the expanding springs 82 which then return the jacks 22 and rollers 20 of both units into their retracted position (Fig. 2).

The instant parking device is highly advantageous for numerous car maneuvers, including parking, which frequently are difficult to perform even by the most experienced drivers. This parking device is also especially safe in that the same is under the full control of the foot brake of the automobile from the moment it assumes the weight of the rear end of the automobile. Thus, the peripheries of the discs 112 of the units 18 and 18' will come into firm engagement with the sidewalls of the tires on the adjacent rear wheels 14 shortly before the rollers 20 touch the ground and before the rear wheels are raised therefrom, and will remain in firm engagement with the tires while the rear wheels are being lifted from the ground. Accordingly, the rollers 20 of the units 18 and 18' will be under the full control of the conventional foot brakes of the automobile, so that the latter is under the full control of the driver even where the ground slopes considerably in the direction in which the rear end of the automobile is to be driven sideways. The instant parking device is also exceedingly simple, durable and rugged in its construction, yet highly reliable in its performance, and may readily be mounted on new automobiles in the factory, or as accessories on used automobiles by ordinary mechanics. Since the instant parking device will, on application, establish its own driving connection with the conventional tires on the rear-wheels of an automobile, no special provisions, changes, or additions need be made insofar as the conventional power drive of the automobile is concerned. Due to the sealed construction of the jacks and the positive gear connections between the friction discs and rollers of the opposite units of the parking device, the latter will perform satisfactorily and reliably even if subjected to dirt which usually accumulates beneath the chassis in bad weather or on bad roads. The opposite units of the instant parking device are also of small bulk and, when mounted, are inconspicuous, if not well hidden from view, especially when not in use. Also, the inclined mounting of the roller stud of each unit in the ram of the jack thereof secures further important advantages. Thus, the inclination of the roller stud permits the use in each unit of a roller which may have a frusto-conical rolling surface of sufficient areal extent to afford secure traction on the ground, and which may for its drive have a simple bevel gear connection with the associated friction disc on the ram. The inclined mount of the roller stud on the lower end of the ram also places the load-carrying portion of the frusto-conical surface of the roller substantially vertically beneath the ram, with the result that the heavy load on the roller will subject the ram hardly to any damaging bending stresses and will, instead, subject the ram primarily to compressive stresses which it will easily withstand without requiring an exceptionally strong and bulky construction of the ram. Also, the inclined mount of the roller stud in the lower end of the ram will result in subjection of the stud by the load on the roller to both, bending and compressive stresses which it will safely withstand without being excessively strong and bulky. Of course, the arrangement of a single roller on the ram of each jack and the permissible slender construction of these parts despite the heavy load which they carry, goes far toward holding the weight and bulk of each unit at a minimum. The opposite units of the instant parking device may in all respects be identical, requiring for their correct performance only the mounting on the rear axle housing of an automobile of one unit reversed from the other. Accordingly, the parts of the parking device may be exact duplicates for both units thereof, and the manufacture of the device is accordingly simplified. The instant parking device also lends itself readily to efficient mass production at low cost, since the device requires relatively few and structurally simple parts which may quickly be assembled without undue skill.

The instant parking device may also be highly useful for changing either rear wheel of an automobile. Thus, if the aforementioned valve within comfortable reach of the driver of the automobile should be such as to afford also selective lowering of either unit, the driver would merely have to set the emergency brake and raise the desired rear wheel off the ground with the adjacent unit of the parking device. The firm engagement of the friction disc of the particular unit with the tire of the rear wheel to be taken off does not greatly interfere with the actual removal of this wheel since mere loosening of the customary wheel bolts will bring about separation between tire and friction disc. By the same token, the mounting of a rear wheel will not be impeded by the adjacent friction disc of the parking device since the disc will not interfere with the usual partial tightening of the wheel bolts before the rear end of the automobile is let on the ground. Once the rear end of the automobile is let down on the ground, and the adjacent friction disc of the parking device is clear of the tire on the wheel being mounted, the wheel bolts may in the usual manner be tightened securely in the customary manner.

If desired, the opposite units of the parking device may be mounted on the same side of the rear axle housing of an automobile, in which case it would merely be necessary to have the roller 20 of one unit of the parking device inclined oppositely to the roller of the other unit with respect to the jacks of both units, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A parking installation in an automotive vehicle having a chassis including rear wheels with tires, comprising jacks carried in inverted fashion by the chassis between and near the rear wheels, respectively, each jack having a ram axially movable toward and away from the ground into operative and inoperative positions, respectively; power means for operating said jacks; a stud projecting from the lower end of the ram of each jack and at an oblique angle to the axis thereof, the axes of said studs being oppositely inclined to each other and equally inclined to the ground and lying in planes substantially parallel to the median planes of the adjacent rear wheels, respectively; identical rollers rotatably but axially immovably mounted on the studs of said jacks, respectively, said rams, when moved into their respective operative positions, lowering said rollers onto the ground sufficiently to raise the rear wheels off the ground and assume their load, and said rollers having frusto-conical surfaces adapted to be in substantially uniform rolling engagement with the ground when said rams are in their respective operative positions; a friction disc mounted on, and axially fixed with respect to, each of said rams, and rotatable about the axis of the corresponding ram; and permanently meshing bevel gears on each roller and associated friction disc, respectively, said friction discs being moved into and from frictional driving engagement with the side walls of the tires on the adjacent rear wheels, respectively, on moving said rams into said operative and inoperative positions, respectively.

2. A parking installation in an automotive vehicle as set forth in claim 1, in which said bevel gears are formed integrally with each roller and associated friction disc, respectively.

3. A parking installation in an automotive vehicle as set forth in claim 1, in which the periphery of each friction disc is axially fluted to afford a good grip on the sidewall of the tire on the adjacent rear wheel.

4. A parking installation in an automotive vehicle as set forth in claim 1, in which said rams are movable substantially vertically toward and away from the ground, and there is provided means on each of said rams spacing each of said friction discs in a direction longitudinally of its axis from the lowermost ground-contacting portion of the adjacent roller by a distance such that said friction discs will come into frictional driving engagement with the tires on the adjacent rear wheels slightly before the latter are raised from the ground when said rams are moved toward their respective operative positions, and will remain in frictional driving engagement therewith during continued movement of said rams into their respective operative positions.

5. A parking installation in an automotive vehicle having a chassis including rear wheels with tires, comprising jacks carried in inverted fashion by the chassis between and near the rear wheels, respectively, each jack having a ram axially movable toward and away from the ground into operative and inoperative positions, respectively; power means for operating said jacks; a stud projecting from the lower end of the ram of each jack and at an oblique angle to the axis thereof, the axis of said stud being inclined to the ground and being inclined in a direction opposite to the axis of the stud of the other jack and lying in a plane substantially parallel to the median plane of either rear wheel; a roller rotatably but axially immovably mounted on the stud of each jack, said rams, when moved into their respective operative positions, lowering said rollers onto the ground sufficiently to raise the rear wheels off the ground and assume their load, and said rollers having frusto-conical surfaces adapted to be in substantially uniform rolling engagement with the ground when the rollers are lowered thereagainst; a friction disc mounted on, and axially fixed with respect to, each of said rams, and rotatable about the axis of the corresponding ram; and permanently meshing bevel gears on each roller and associated friction disc, respectively, said friction discs being moved into and from frictional driving engagement with the side walls of the tires on the adjacent rear wheels, respectively, on moving said rams into said operative and inoperative positions, respectively.

6. A parking installation in an automotive vehicle having a chassis including rear wheels with tires, comprising jacks carried in inverted fashion by the chassis near the rear wheels, respectively, each jack having a ram axially movable substantially vertically toward and away from the ground into operative and inoperative positions, respectively; power means for operating said jacks; a roller carried by the lower end of the ram of each jack for rotation about an axis extending obliquely to the direction of movement of said ram and lying in a plane substantially parallel to the median plane of the adjacent rear wheel; a friction disc mounted on, and axially fixed with respect to, each of said rams, and rotatable about the axis of the corresponding ram, said rams, when moved into their respective operative positions, lowering said rollers sufficiently to raise the rear wheels off the ground and assume their load; means on each of said rams spacing each of said friction discs in a direction longitudinally of its axis from the lowermost ground-contacting portion of the adjacent roller by a distance such that said friction discs will come into frictional driving engagement with the tires on the adjacent rear wheels slightly before the latter are raised from the ground when said rams are moved toward their respective operative positions, and will remain in frictional driving engagement therewith during continued movement of said rams into their respective operative positions; and a positive driving connection between each friction disc and associated roller so that said rollers will, in the operative positions of said rams, be driven from the tires on the adjacent rear wheels and laterally roll the rear of the vehicle on the ground.

References Cited in the file of this patent

UNITED STATES PATENTS

| 1,387,626 | Swanson | Aug. 16, 1921 |
| 1,513,282 | Sheets | Oct. 28, 1924 |
| 1,815,207 | Moffat | July 21, 1931 |
| 2,165,461 | Dreisbach | July 11, 1939 |
| 2,167,929 | Johnson | Aug. 1, 1939 |
| 2,364,553 | Rische | Dec. 5, 1944 |
| 2,612,230 | Jezler | Sept. 30, 1952 |

FOREIGN PATENTS

| 2,507 1876 | Great Britain | June 16, 1876 |